Patented June 23, 1936

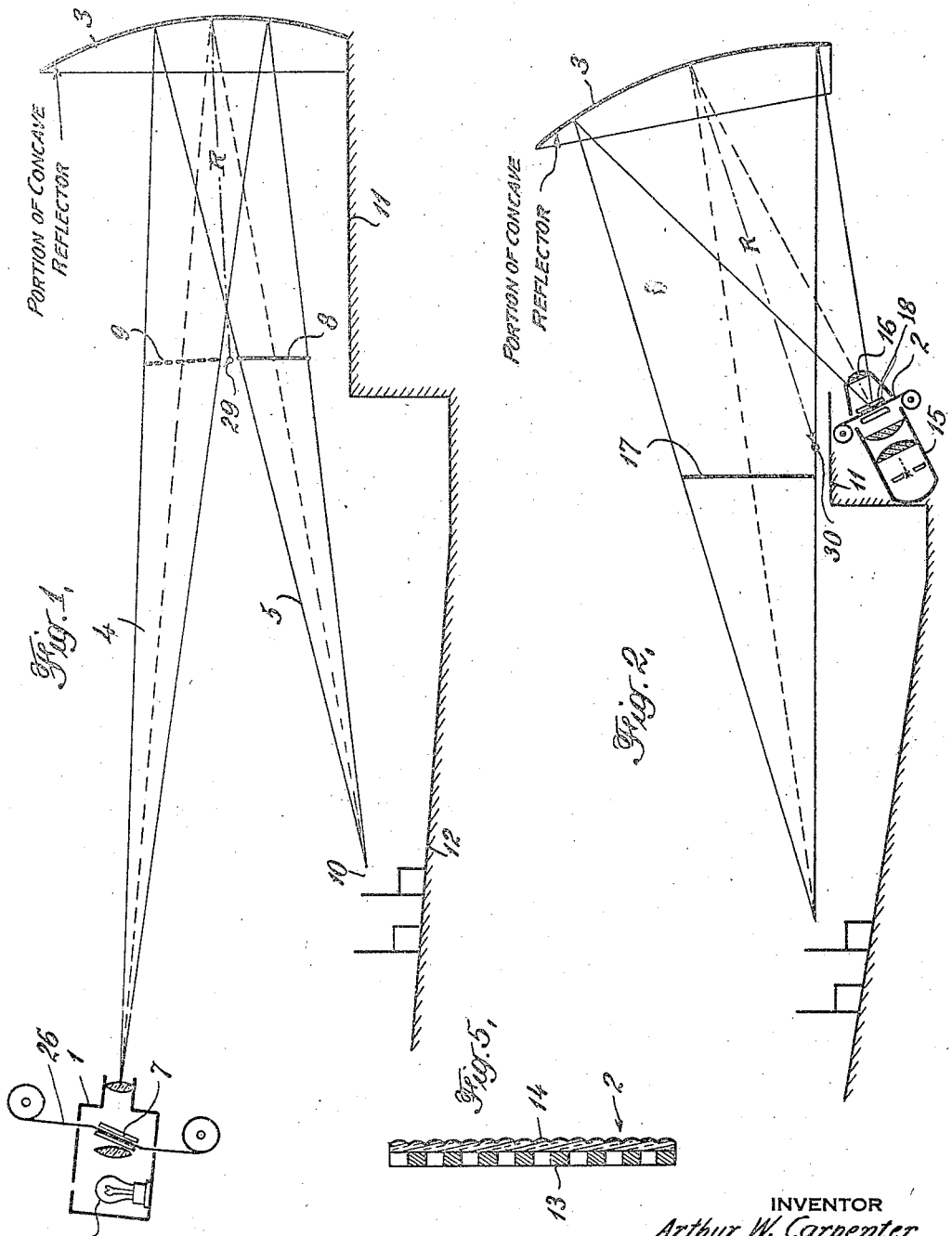

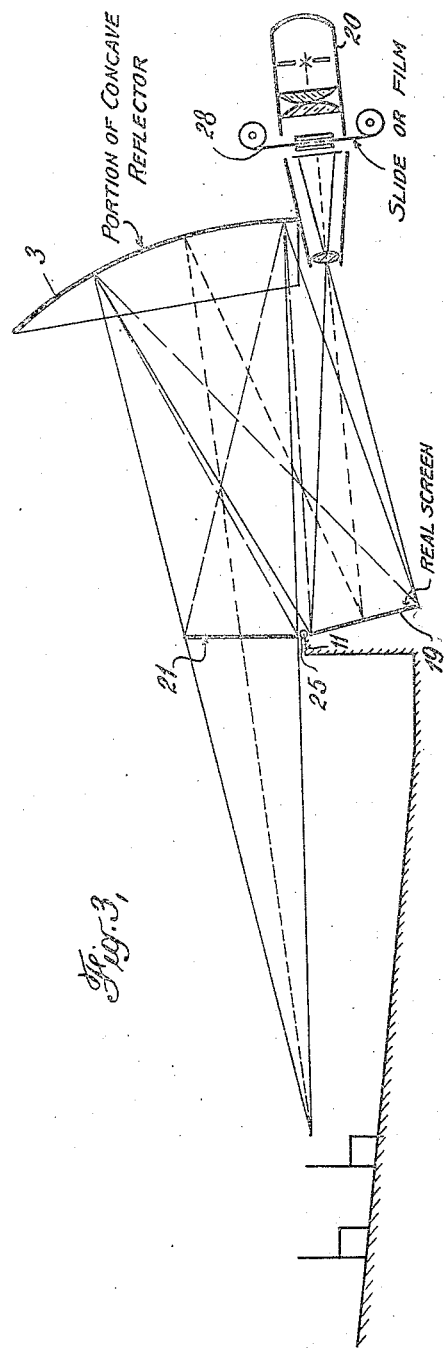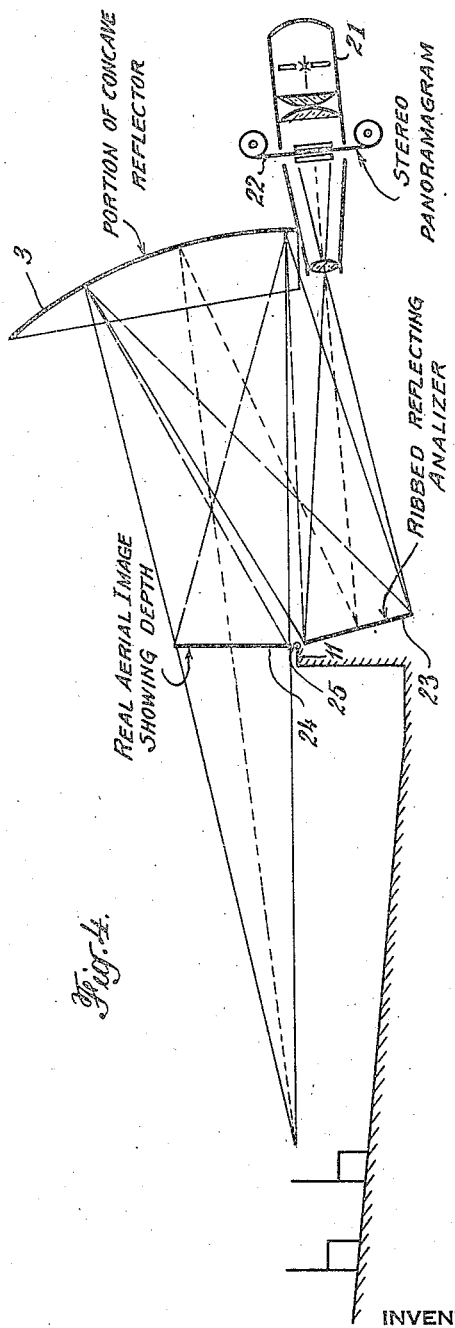

2,045,120

UNITED STATES PATENT OFFICE 2,045,120

PROJECTION OF MOTION PICTURES

Arthur W. Carpenter, New York, N. Y., assignor to United Research Corporation, Long Island City, N. Y., a corporation of Delaware Application September 28, 1933, Serial No. 691,264

6 Claims. (Cl. 88—16.6)

The invention relates to an improved method and apparatus for presenting stereograms for viewing by projection.

I have heretofore proposed to produce a stereogram on film. However, regardless of the particular type of interlined stereogram which may be achieved on film, whether it be plain parallax stereograms containing two interlined stereoscopic images or interlined stereograms of the panoramagramic type as described by others or stereograms containing interlined groups of finite object azimuth or station views, as described in my applications Serial Nos. 690,829 and 690,830, filed September 25, 1930. Nevertheless, it remains an inherent disadvantage of all of these stereograms that there is a great waste of light when the picture is presented for viewing, especially if this presentation be by means of the usual forms of projection.

When such stereograms are presented for viewing in conjunction with super-imposed opaque lined screens as analyzing lineaters, it is obvious that at least one-half of the available light is blocked out or wasted by the analyzing screen. If, as is the case in most instances, the ratio of transparent spaces to opaque lines in the said analyzers is as one clear unit to several opaque units, for example, one to four or one to nine, then it is obvious that an even larger proportion of the available light is wasted by the analyzer. In the last mentioned case, this wastage runs as high as 90% of the available light.

Even when other types of analyzers, such as ribbed transparent refracting screens are used, the economy of available light is only a little higher, and this waste of light is an inherent feature of the presentation for viewing of parallax stereograms.

An object of the present invention is to offset this waste of light, and to increase the screen illumination of the projected stereograms.

The method and means which I here describe do not propose to alter this inherent quality of light wastage in the interlined stereograms, but do propose to offset this discrepancy to a large extent by increasing the light efficiency of the apparatus by which the stereogram is presented for viewing. I do not seek to accomplish this end by increasing the brilliancy of the light sources, because such sources of blinding intensity are already conveniently available. I do, however, seek to increase the apparent intensity of the illumination at the projected image by making more of the existing image forming light available to the eye of the observer.

Another object of the invention is to present the projected stereogram for viewing by a large number of people such as a theatrical audience.

Another object of the invention is to obviate the necessity, in projecting a large stereogram image, of accurate registration between the picture line elements of the stereogram with the lines of the line screen.

The preceding object is accomplished by embodying a ribbed transparent refracting screen on the film which carries stereograms representing the successive kinematic phases of the action, and by projecting the lineated stereograms therein as real aerial images. The projection of real aerial images avoids the necessity for a physical projection screen.

The use of aerial images therefore effects an economy of light and avoids a physical screen. Both of these features while particularly applicable to the projection of motion pictures in stereoscopic relief, are generally useful in still or motion pictures, whether ordinary black and white pictures, or pictures in color with or without stereoscopic relief.

The embodiments which I propose may be better understood if I first dwell briefly upon several of the concepts which underlie the methods and apparatus which I propose to use.

In the case of the simple projection of an image on to a reflecting screen by means of the customary type of projection apparatus, it will be seen that only a portion of the sphere of light emanating from the light source is collected by the lens of a condenser system and by this condenser directed toward the objective through the film or transparency which it is desired to project.

A spherical angle or cone of initial radiation which is collected by the proximal lens of the condenser represents the greatest amount of light energy available for the projection. This available energy is reasonably conserved during its passage through the condenser and its convergence to the projection objective, but at this projection objective and from this point on, large quantities of the available light are so distributed and dispersed as not to be available to the observer for whose use the light is presumably projected.

In order that the projected image appear to be more or less evenly illuminated, it is necessary that the reflecting surface be a surface yielding highly diffused reflection. In other words, every point of this reflecting surface shall reflect almost equally in all directions the light which is incident upon it from any direction. From this it follows that the light directed toward the eye of the observer from any point of the reflected image can be at best but a minute part of the light which entered into the formation of that image at that point, and hence the apparent brilliancy of the reflected image can be at best but a minute part of the actual brilliance of the image.

Now, it is often proposed in projection practice that this reflecting surface should be made specular rather than diffuse in its nature. If this is done to its fullest extent, and a plain specular reflecting surface, such as a mirror, substituted for the diffused reflecting surface of the ordinary screen, it is found that a much less satisfactory result is achieved.

In this case, by the laws of incidence and reflection, most of the light which enters into the formation of the image at the screen, is so directed by reflection that no part of it can reach the eye of the observer, and hence the portions of the screen whereon these portions of the image are formed appears to the observer to be unilluminated.

Only in that small area of the reflector, which is subtended by the virtual image of the projection lens as seen from the observer's eye, appears to be illuminated. In other words, only that small portion of the reflector within which the projection objective can by the laws of incidence and reflection direct light into the observer's eye, is useful for viewing an image by specular reflection. Within this tiny area, howsoever, the illumination of the image by the ordinary types of illuminants and projection optics is dazzlingly intense, and in order to make it possible to view the image in such an apparatus, it is necessary to reduce the intensity of the illuminant from that of the usual projection lamp, for example, to that of a low wattage frosted or flashed lamp bulb.

Insofar as this specular type of reflection can be used, then it is seen that there is in effect an enormous economy of available illumination, and it is this principle which I employ for the more efficient projection of parallax stereopanoramagrams and the like.

Pausing yet a moment to consider further inherent differences between specular and diffuse reflector, it is seen that in the case of a diffuse reflector, if the image formed by the projection apparatus is formed elsewhere than at the surface of the diffused reflector, only a blurred or indistinct image can be seen by the observer. In the case of a specular reflector, this limitation does not apply, and insofar as the image can be seen by the observer, it may be formed at the surface of the reflector or before or beyond the surface of the reflector equally well, the only difference so far as the observer is concerned being in the apparent size and position of the image which is formed.

Now, if a specular reflector can be used which makes it possible for the virtual image of the projection objective to subtend the angle of view of the observer's eye when the latter is directed toward any part of the projected image, then the aforementioned enormous economy of illumination will prevail throughout the area of the projected image.

Such a condition is obtained by this invention by the use of a specular reflector having a concave instead of a plain surface. Such a concave specular reflecting surface may be either a simple spherical surface having a radius of curvature appropriate to the particular requirements of the set-up, or to fulfill certain special requirements it may be parabolic, hyperbolic, or ellipsoidal in form.

With each of these forms, conditions may be established such that as the observer looks towards any part of the projected image, he will see that point of the image against the background of the radiant light source, and it will therefore appear to be brilliantly illuminated even when the light source is of very low intrinsic intensity.

With the conic forms of concave surfaces, these conditions may be fulfilled for limited viewing positions with very great efficiency. With the spherical forms of concave surfaces, these conditions can be fulfilled reasonably well for a large number of observers with a comparatively high degree of efficiency, and by the use of such a reflecting surface, much of the disadvantage inherent to the wastage of light in showing a parallax stereogram may be offset because the gain in light by the efficient use of specular reflection is often greater than the loss of light due to analysis of the parallax stereogram.

In practice, I generally make use of the plain spherical or slightly parabolized concave reflector of comparatively long radius of curvature, it being only necessary that the area of said reflector be great enough to fulfill the aforementioned requirements throughout as great a field of view as is to be utilized by the observer or observers. Of course, in theatre projection, this means that nearly the whole background of the ordinary stage area must be covered by the concave reflector, and this means a pretty large reflector of this nature, but there are certain ameliorating circumstances which makes such an apparatus more practical than it might at first seem, and I shall mention these circumstances presently. meanwhile, I wish to refer again to the fact that with a specular reflecting surface, the image formed by the projector may be positioned elsewhere than at the surface of the reflector, and this property I make use of in my apparatus to gain an added convenience in projection by this method and to facilitate the showing of a comparatively large image with a comparatively short projection throw.

For further details of the invention reference may be made to the drawings wherein Figure 1 is a schematic side elevation of projection apparatus, particularly applicable to ordinary motion picture projection according to the present invention, the projector being located above the audience as in standard theatre practice.

Figure 2 is a schematic side elevation of an alternative, wherein the projector is arranged close to and below the center of the reflecting mirror, resulting in a magnified image, useful with ordinary film or with the film of Figure 5 for stereoscopic relief.

Figure 3 is a schematic side elevation of a modification of Figure 1 employing a real screen out of the direct line of view of the audience, with means for forming an aerial image of the ordinary still or motion picture projected on the real screen.

Figure 4 is a further alternative wherein a ribbed lenticular reflector concealed from the audience is employed for analyzing a stereogram which is projected for viewing, as a real aerial image.

Figure 5 is an enlarged sectional view of motion picture film for use with Figure 2 and having an interlined kinematic stereogram thereon and integral with a lineater comprising cylindrical ribs.

Referring in detail to the drawings, the picture projector 1 is arranged to abaxially project the pictures on ordinary film 26 onto the spherical reflector 3 having a center of curvature at 29. By abaxially projecting the picture onto reflector 3, the line 4 of projection does not interfer with the line 5 of observation. The projector 1, for reasons above noted, need not be provided with the usual high intensity arc light, and instead may employ a low intensity source of illumination such as the frosted incandescent lamp 6. The images on film 26 are upside down as they are rectified by the reflector 3. The film gate 7 of the projector is arranged at an angle as shown, in order that the aerial image 8 may be upright. In the case illustrated in Figure 1, the projector 1 focuses the images on film 26 in the plane 9, which is distant from the reflector 3 in amount equal to the radius of curvature R of the reflector 3. There is no screen provided in the plane 9 and the focused image there formed is unobservable by the audience in seats such as 10 in the theatre. In this case the aerial image 8 is formed on the stage 11 at a distance from the reflector 3 equal to the radius of curvature R thereof. The projector 1 may be focused to bring the image plane 9 closer to the reflector 3 than above described, whereby the aerial image 8 will be larger than the image in plane 9, or the projector 1 may be focused to bring the image plane 9 farther away from the reflector 3 than is illustrated in Figure 1 whereby the aerial image 8 will be smaller than the image in plane 9. In fact the locus of plane 9 may substantially coincide with the surface of reflector 3.

As illustrated, a segment of a spherical reflector may be employed with the bottom edge of this reflector substantially parallel with the floor of stage 11. The horizontal width of the bottom of the reflector 3 at or near the floor of the stage, and in a direction at right angles to the drawings, is comparable to the width of the first horizontal row of observing stations or theatre seats 12.

The arrangement in Figure 1 conforms to standard theatre practice as the projector 1 is arranged above the audience, with a long projection throw from the projector 1 to the reflector 3.

Figure 2 illustrates an alternative wherein the projector 15 is abaxially arranged below the center line of the spherical reflector 3, and also arranged closer to the reflector 3. The center of curvature of reflector 3 is illustrated at 30. In this case the projector 15 is provided with a wide angle projection objective 16 to fill the front surface of the reflector 3 with light. In Figure 2 the real aerial image is formed in the plane 17 on the stage 11, without the use of a screen as before, the projector 15 being located below the stage 11. In this case also the picture images on the frames of the film 2 are upside down as they are inverted in being reflected from the reflector 3. Also the film gate 18 is set at the proper angle to cause the image plane 17 to be vertical.

Preferably the projector 15 is furnished with a film 2 such as illustrated in Figure 5 which contains an interlined stereogram 13, the film having integral therewith cylindrical ribbing 14 which extends lengthwise of the film and which serves as a lineater for the stereogram record 13.

The stereogram film record 2, a sectional view of which is illustrated in Figure 5, may be prepared in any one of a number of different ways as above described. In any case, the successive frames of film 2 contain records of successive kinematic phases of a moving object, each such phase being recorded as an interlined stereogram, wherein a stereoscopic record appears as an interlineation of picture elements.

For recording an interlined stereogram on film, I find it satisfactory to use more than 300 and less than 600 lines per inch. For example, 35 mm. film has about 420 lines or ribs per inch, there being a corresponding number, that is, 420 groups of picture elements 13 in each frame of the film.

In Figure 3 use is made of a real screen 19 which is below the stage 11, however, and therefore out of the direct line of view of the audience. The projector 20 which is similar to the projector in Figures 1 and 2, the film gate of which need not necessarily be tilted however, projects an ordinary still or motion picture from film 28 onto the screen 19 which is abaxially arranged with respect to the center line of reflector 3, a real aerial image of the ordinary still or motion picture being formed in the plane 21 on the stage 11. The center of curvature 25 of reflector 3 as shown in Figure 3 is between the bottom of aerial image 21 and the top of screen 19.

Figure 4 illustrates a further alternative wherein the projector 21 is supplied with film 22 which is an interlined stereogram of two or more images or of the panoramagramic type. The center of curvature 25 of reflector 3 is positioned as in Figure 3. The analysis is performed outside of the projector 21 by a ribbed reflecting analyzer 23 which is abaxially arranged with respect to the center line of reflector 3 to form a real aerial kinematic stereoscopic image in the plane 24 on the stage 11. The line pitch of the stereogram on film 22 is projected in register with the ribs on analyzer 23.

The formation of real aerial images by the concave spherical reflector 3 is subject to well known and fully described optical laws, and admits of magnification or minification according to laws very similar to those which govern the formation of images by refracting lenses. These reflector images, however, are free from defects due to chromatic aberrations, and in respect to certain other aberrations common to refracting lenses, they are superior to refracted images.

Moreover, within reason, it is more convenient to form abaxial images with a concave reflector by abaxial displacement of the object than it is to correspondingly form abaxial images with a refracting lens. This fact I also make use of in the apparatus of Figures 1-4, in that it is convenient in setting up such apparatus for theatre projection to make use of abaxial projection to a sufficient extent to just conveniently avoid physical interference between the line of projection and the line of observation.

Now, if we consider an aerial projected image as seen by the observer, it will become evident that the only portions of the concave reflector which enter into the formation of that image so far as that observer is concerned, is that portion of the reflector subtended by the image. In other words, the only useful portion of the reflector is that portion embraced by the boundaries of the image, if the said boundaries are projected back against the reflector from a point located at the eye of the observer. This in practice is found to be a portion of the reflecting surface only somewhat greater than the actual area of the image, and if more than one observer is to be simultaneously served by the reflector, it is found that only that portion of the reflector which is necessary to subtend a spherical angle great enough to include all of the desired viewing positions is required.

In practice I find that little more than the upper half of the spherical reflector having a horizontal chord approximately equal to the length of the nearest row of observing stations is required for satisfactory theatre projection.

In most instances, it is not necessary to use the uppermost portions of even this half since the upper part of the reflector would only be serviceable for viewing the image from a position in the orchestra pit ahead of the front seats. A part of my invention therefore consists in the use of a selected portion of a concave reflecting surface for the formation of the image which is to be viewed by the audience. Nor do I particularly limit myself to any particular shaped section of such reflectors, since in the case of one auditorium a complete zone is best adapted, whereas for other auditoriums rectangular sections of various proportions may serve to better advantage.

Neither am I limited to any particular radius of curvature for these reflectors, since this is a feature of the reflector which is variable according to the circumstances of the desired position of the image, or the reflector itself, or of the audience, and of the size or position of the film and projecting apparatus which it is desired to use.

As a measure of convenience in the practical erection of such reflectors, I might mention that if the reflector is spherical then it may be conveniently built up of a large number of individual portions since all portions of the spherical surface embraced within similar boundaries are obviously identical. As to how such reflectors may be formed, there is embraced within my invention obviously a wide scope of available practices.

I may build the reflecting surface out of suitable building blocks, each of which is a repeating unit of such surface and specularly reflecting on its face, or I may use such blocks which are not reflecting, and when the whole surface is erected, coat it with a suitable specular reflecting medium, as for example, by spraying it with volatilized metal to create a continuous metallic reflecting coating as by well known commercial metal spraying processes, or I may form this surface in plastic materials by the use of sweeps, and surface it by spraying or painting with substances having a high percentage of specular reflection, or yet again I may form matrix surfaces and produce reflectors from them by electro-plating or other similar process.

I claim:

1. Picture projection apparatus comprising the combination of a concave reflector facing a number of viewing stations and comparable in width to the horizontal extent of the proximate viewing stations, means for abaxially projecting an interlined stereogram towards said reflector, said projector comprising means for focusing the projected stereogram at a locus in front of said reflector, whereby a real aerial image of said stereogram is formed abaxially of said reflector out of the line of said projection, and means intermediate said projector and said reflector for analyzing said stereogram to produce said real image in relief.

2. Picture projection apparatus comprising the combination of a concave reflector facing a number of viewing stations and comparable in width to the horizontal extent of the proximate viewing stations, means for abaxially projecting a kinematic interlined stereogram towards said reflector, said projector comprising means for focusing the projected picture at a locus in front of said reflector, whereby a real aerial image of said picture is formed abaxially of said reflector out of the line of said projection, and means in registry with the lineations of said stereogram for producing said picture in relief.

3. In a system for projecting real aerial images for observation by observers, said images being positioned perpendicularly to a stage platform in front of said observers, the combination of a projector having a projection lens therein, a concave reflecting surface to receive the light from said projector and to reflect said light to form a real image between said reflector and the observers, and means within said projector for abaxially positioning the film to produce the image being reflected at a predetermined angle with respect to the viewing point of said observers.

4. A system for the formation of large real aerial images in relief to be viewed by observers comprising an integral stereogram and a lineater therefor, a projector for said stereogram said projector including a magnifying lens anterior of said stereogram, and a concave reflecting mirror so arranged with respect to the position of said sterogram in said projector that an enlarged real stereoscopic aerial image of said lineated stereogram is formed intermediate said reflector and the observers, the stereogram image being enlarged in proportion to the magnifying power of said lens.

5. In a system for observing large real aerial images in relief at a position corresponding to the usual location of a projection screen in a theatre, the combination of a concave spherical reflector in the line of sight of an observer, a projector out of the direct line of sight of said observer, an interlined stereogram in said projector, a lineater in optical registry therewith, and a magnifying lens in said projector, said projector being so arranged and the reflector being so positioned that the said lens of the projector and said reflector cooperate to produce an enlarged real image of the interlined stereogram, said real image being produced at the usual location of a projection screen.

6. In a system for observing large real aerial images at a position corresponding to the usual location of a projection screen in a theatre, the combination of a concave spherical reflector in the line of sight of an assembly of observers, a diffusing screen abaxially of said reflector and out of the line of sight of the assembly of observers, the light therefrom being diffused to the surface of said reflector within the line of sight of all of the observers, and, means for projecting an enlarged image on said screen and producing a real aerial image, the abaxiality of the diffusing screen being such as to position the real image of said screen at the usual location of a projection screen in a theatre, said aerial image being observable by each observer of said assembly from respective portions of said reflector.

ARTHUR W. CARPENTER.